United States Patent [19]

Sadler et al.

[11] 3,947,157

[45] Mar. 30, 1976

[54] SINGLE CYLINDER PUMP

[75] Inventors: Harry J. Sadler, St. Paul; Ramon Pareja; John Leschisin, both of Minneapolis, all of Minn.

[73] Assignee: Lear Siegler, Inc., Santa Monica, Calif.

[22] Filed: Nov. 2, 1971

[21] Appl. No.: 194,851

[52] U.S. Cl. .................... 417/559; 92/168; 277/69; 277/73

[51] Int. Cl.[2] ...................... F04B 21/08; F16J 15/18

[58] Field of Search ........... 417/470, 471, 559, 539; 92/168

[56] References Cited

UNITED STATES PATENTS

| | | | |
|---|---|---|---|
| 2,136,239 | 11/1938 | Ernst | 92/168 X |
| 2,281,933 | 5/1942 | Gage | 92/168 X |
| 3,238,890 | 3/1966 | Sadler et al. | 417/566 X |
| 3,362,345 | 1/1968 | Sparger | 92/168 |
| 3,413,929 | 12/1968 | Cook et al. | 92/168 X |
| 3,503,304 | 3/1970 | Comeau et al. | 92/168 |

FOREIGN PATENTS OR APPLICATIONS

| | | | |
|---|---|---|---|
| 369,557 | 3/1932 | United Kingdom | 417/471 |

*Primary Examiner*—William L. Freeh
*Assistant Examiner*—Leonard Smith
*Attorney, Agent, or Firm*—Orrin M. Haugen

[57] ABSTRACT

A reciprocating pump fabricated from an assembly including a body having a cylinder bore formed therein for receiving a reciprocating plunger, and with a transverse bore extending radially outwardly from the cylinder bore at a certain axial position, and passing through the wall of the pump body. A counterbore is formed along the cylinder bore and is arranged to receive a stacked assembly of guide means, packing means, and lantern ring means. The guides are operative to control the radial thrust on the plunger, while the lantern ring is arranged to provide communication from the interior of the cylinder bore to the atmosphere. The packing means includes a pair of axially displaced ring seals, one each being disposed on opposite sides of the lantern ring, and providing for mutual isolation between the pumping chamber of the pump and the crankcase.

9 Claims, 6 Drawing Figures

INVENTOR
HARRY J. SADLER
RAMON PAREJA
JOHN LESCHISIN
BY
Orrin M. Haugen
ATTORNEY FIG. 4.
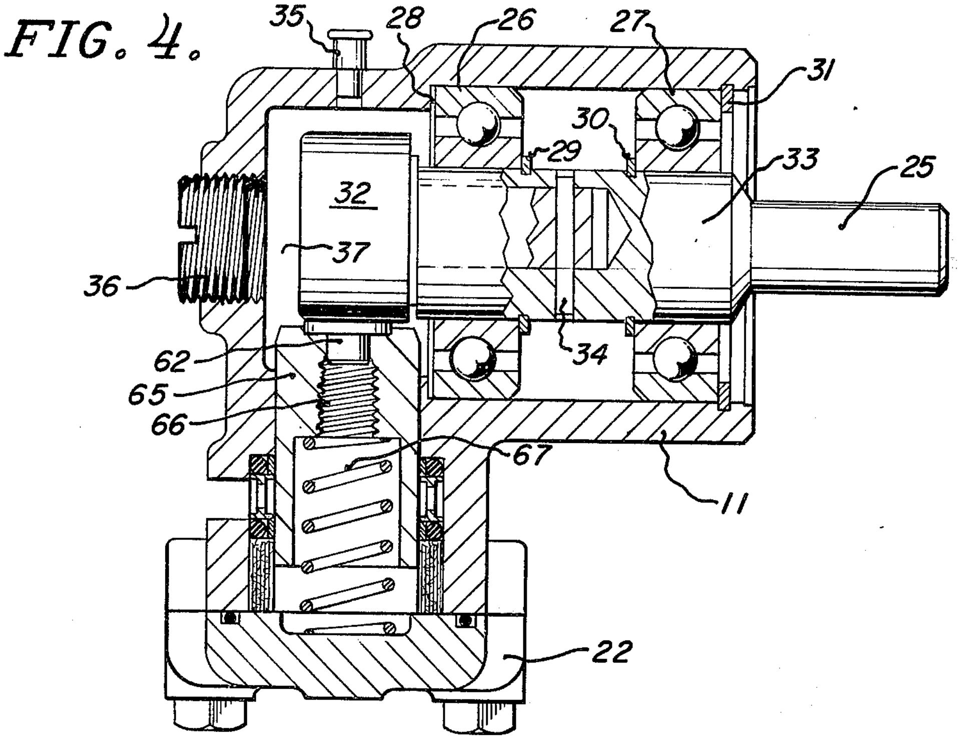
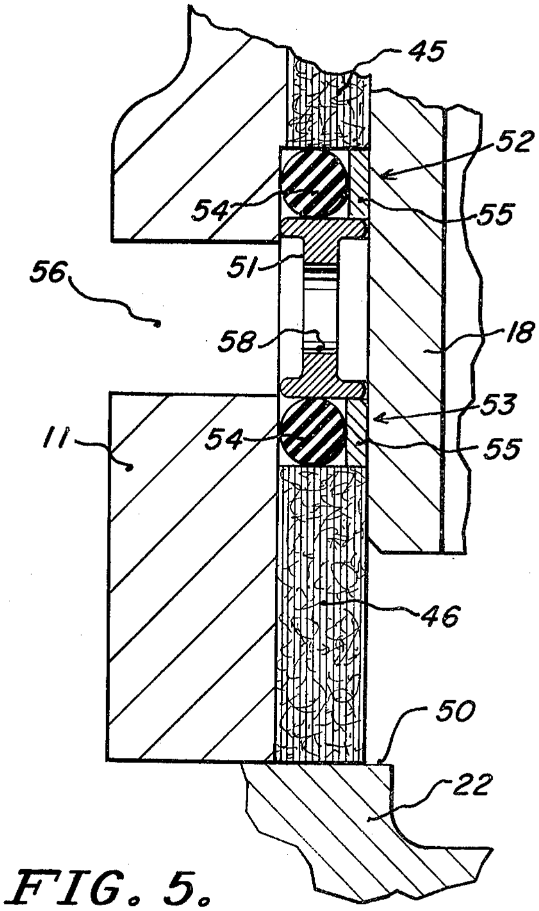
FIG. 5.
FIG. 6.
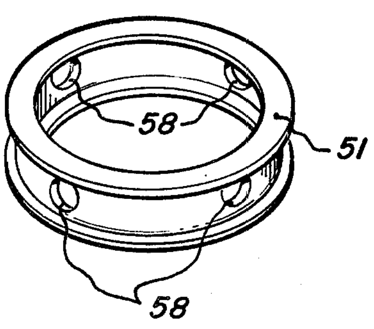
INVENTOR
HARRY J. SADLER
RAMON PAREJA
BY JOHN LESCHISIN
Orrin M Haugen
ATTORNEY

SINGLE CYLINDER PUMP

BACKGROUND OF THE INVENTION

The present invention relates generally to a reciprocating pump structure, and more particularly to a piston-type pump which is rugged and durable, being fabricated from a minimum number of components, and which may be easily assembled and disassembled for purposes of maintenance and repair. The structure is particularly easily serviced in connection with assembly of guides and packings. In addition, the structure utilizes a resilient spring member to stroke the piston or plunger in one axial direction.

In the preparation of reciprocating pump structures, design features which provide for ease of assembly and maintenance are highly desired. It is desired that these structures, in addition to being durable and rugged, are also easily assembled and serviced. In the normal operation of reciprocating pumps, the components which require the most frequent attention from the standpoint of service and maintenance are the piston or plunger guides, along with the packings and seals. It is, accordingly, a desirable feature to provide for ease of assembly, accessibility, and re-assembly of these components in the finished product. The apparatus of the present invention provides these advantages to a significant degree.

SUMMARY OF THE INVENTION

Essentially, the pump structure of the present invention employs a pump body having conventional inlet and outlet ports, along with the inlet and outlet valves. The structure is provided with a pumping cylinder which receives a reciprocating plunger arranged for movement within the cylinder. A transverse bore or slot is formed in the body in order to establish communication between the cylinder and the atmosphere. The structure further includes a composite stacking of guides, packings, and lantern ring, with the guides normally being disposed at the extremities of the pumping cylinder area, and with the lantern ring being disposed generally intermediate the ends and communicating with the transverse bore or slot. The sealing means are normally and preferably disposed on opposite sides of the lantern ring and provide for isolation between the crankcase and the pumping chamber. Thus, when leakage occurs from either the pumping chamber or the crankcase, cross-contamination will not occur with the leakage or drainage being permitted to pass through the lantern ring to the atmosphere. Preferably, the lantern ring is provided with a plurality of spaced bores to accommodate any such leakage.

In order to stroke the plunger or piston element, the drive shaft is provided with eccentric means for moving the piston during the pressure stroke, and a resilient compression spring is provided for accommodating the return or inlet stroke for the piston. Such a structure eliminates the requirement of having a yoke assembly coupled to the eccentric means for returning the piston or plunger during the inlet stroke. Such an arrangement enhances the serviceability of the structure and provides for ease of maintenance and repair.

Therefore, it is a primary object of the present invention to provide an improved reciprocating pump structure which is fabricated from a minimum number of components, and which is arranged for ease of assembly, disassembly, and servicing.

It is a further object of the present invention to provide an improved reciprocating pump structure having a crankcase portion for retaining lubricant for certain of the moving components, and wherein means are provided for eliminating cross-contamination between the crankcase lubricant and the fluid being pumped.

It is yet a further object of the present invention to provide an improved single piston reciprocating pump utilizing a stacked arrangement of guides, packings, and lantern ring which stacked arrangement may be easily and readily removed and replaced as required.

Other and further objects of the present invention will become apparent to those skilled in the art upon a study of the following specification, appended claims, and accompanying drawings.

BRIEF DESCRIPTION OF THE DRAWINGS

FIG. 4 is a vertical sectional view taken along the line and in the direction of the arrows 4—4 of FIG. 1, with this view illustrating a modified form of guide and packing stacking arrangement;

FIG. 5 is a detail sectional view on a slightly enlarged scale, and illustrating a segment of the body wall and guide-seal-lantern ring stacking arrangement as shown in FIG. 1; and FIG. 6 is a perspective view of the lantern ring which is utilized in combination with the packing and guide arrangements of the pump of the present invention.

DESCRIPTION OF THE PREFERRED EMBODIMENT

Figure 1:
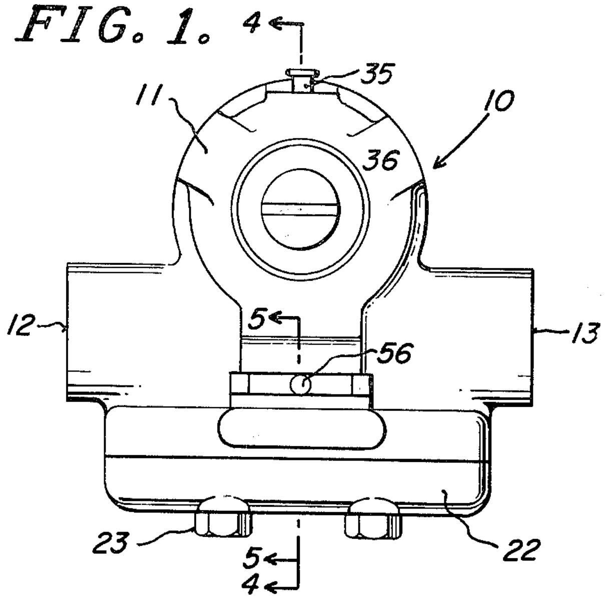
FIG. 1 is a front elevational view of the reciprocating pump structure of the present invention.
Figure 2:
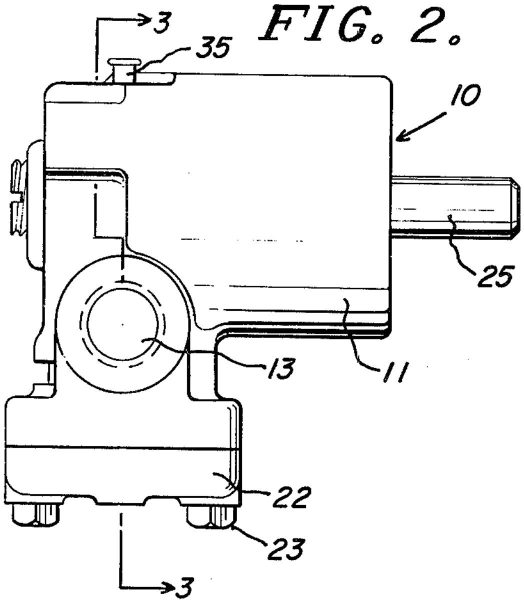
FIG. 2 is a side elevational view of the structure illustrated in FIG. 1.
Figure 3:
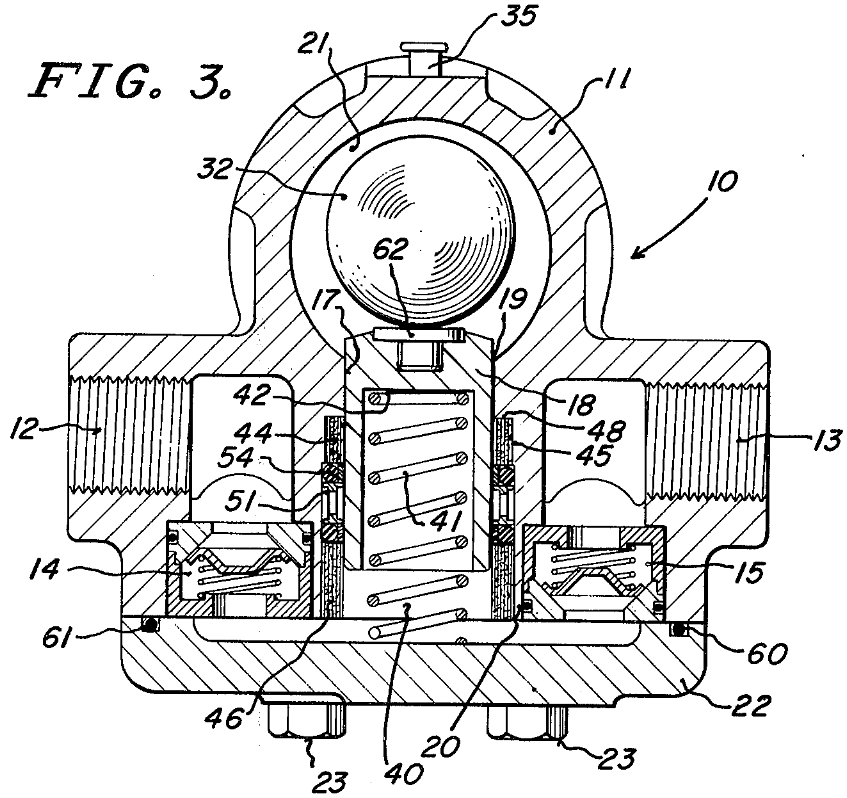
FIG. 3 is a vertical sectional view taken along the line and in the direction of the arrows 3—3 of FIG. 2, and illustrating the working components of the structure.

In accordance with the preferred modification of the present invention, and with particular attention being directed to FIGS. 1–3 of the drawings, the reciprocating pump structure generally designated 10 includes a body member 11 having an inlet port 12, and outlet port 13, along with inlet and outlet valves 14 and 15 respectively. The body 11 has a cylindrical bore 17 formed therein, the bore 17 being arranged to receive the reciprocating plunger means generally designated 18. The bore 17 has an inner terminal end as at 19, and an outer terminal end as at 20, with the body 11 having a crankcase zone 21 formed adjacent the inner end 19. Head 22 is secured to the body 11 adjacent the outer end 20 of the bore 17, head 22 being secured to the body by means of a plurality of cap screws such as at 23–23.

A rotary drive shaft 25 is provided in the assembly, with this shaft being journaled for rotation in bearings 26 and 27. The bearing 26 is held in proper position within the body by means of the shoulder abutment 28 formed in the body along with snap ring 29. Snap rings 30 and 31 are utilized to hold or retain bearing 27 in proper disposition. Cam bearing 32 is secured to bearing pin 33, with pin 33 being press-fit into a bore formed in shaft 25, and retained in place by means of retaining pin 34 which is secured transversely in shaft 25. Cap 35 is utilized to receive lubricant for the crankcase, with the lubricant extending through the entire crankcase area and providing lubrication for cam bearing 32, as well as bearings 26 and 27. Plug 36 is threadably received within the body 11, and may be removed in order to accommodate drainage of the lubricant retained in the confines of the crankcase zone, such as the zone 37.

The bore 17, as indicated, accommodates and receives reciprocating plunger member 18. A pumping chamber is defined by the bore 17, and generated by motion of the reciprocating plunger 18, with the pumping chamber area being shown generally at 40. Compression spring 41 is provided in the structure, and is received in cavity 42 formed in the body of plunger 18. Compression spring 41 is accordingly compressed between the base of cavity 42 and the inner surface of head 22, and accordingly provides for movement of the plunger 18 inwardly during the intake stroke.

Attention is now directed to FIGS. 3 and 5 wherein the details of the guide rings, packing, and lantern ring are illustrated. Specifically, this stacked arrangement is disposed within counterbore 44 formed in bore 17, with a pair of guides being shown at 45 and 46. Guide 45, which is a conventional graphite piston guide, is seated against an abutment step 48 formed at the end of counterbore 44, while guide 46 is retained at the outer end of counterbore 44. Head 22 has a face surface as at 50 (FIG. 5) which maintains constant contact with the outer surface of guide 46 and retains the stacked arrangement in place. Lantern ring 51 is interposed between a pair of seals shown generally at 52 and 53, seals 52 and 53 each including an O-ring 54 and a contact ring 55, contact ring 55 being prepared from polytetrafluoroethylene, such as "Teflon" or the like. As is indicated in FIG. 5, a transverse bore shown at 56 is provided to arrange for communication between the inner portion of the pumping cylinder area and atmosphere. The details of lantern ring 51 are shown in FIG. 6, with ring 51 having an I cross-section, with a plurality of bores such as the bores 58–58 being formed herein. The I configuration provides for a greater area of contact between O-rings 54 and lantern ring 51 for sealing purposes. Thus, the manufacturing tolerances are greater in this arrangement.

The details of design of inlet valve 14 and outlet valve 15 are provided in U.S. Pat. No. 3,238,890, as well as the details of design of head 22. As is indicated, O-ring 60 is provided to seal head 22 to body 11, with O-ring 60 being disposed in groove 61 formed in head 22. It will also be appreciated that valves 14 and 15 are retained in place by virtue of contact with face 50 of head 22.

It will be appreciated that transverse bore 56 formed in body 11 may be either in the form of a bore or a slot. The essential feature is that an opening be established to accommodate removal of any leakage from either the crankcase side or the pumping chamber side.

In order to increase the life of the plunger 18, wear pin 62 is provided at the base of plunger 18. Pin 62 is preferably pressed into an opening or cavity formed in plunger 18 and is accordingly retained in place in that fashion. Pin 62 is, of course, hardened to a greater degree than plunger 18 and as such provides a long life wearing surface for the plunger 18 in its contact with cam bearing 32.

As is indicated in FIGS. 3 and 4, cam bearing 32 utilizes needle bearings to separate the outer race from the center of bearing structure. Such an arrangement provides for a low friction drive for the pump assembly. In order to control the capacity of the pump, reference is made to the radial disposition of the crank pin receiving bore formed in the drive shaft 25. Accordingly, with a single cylinder pump, the required capacity may be designed into the unit.

In order to enhance the ease of servicing, it will be observed that the base end portion of plunger 18 is tapered inwardly, thus enhancing the ability of the serviceman to re-assemble the unit following replacement of the guide-packing-lantern ring stack. Accordingly, it is possible for the serviceman to assemble the plunger into the bore and simultaneously expand the polytetrafluoroethylene ring members 55–55. Closure of the head 22 onto the arrangement will accordingly compress and expand O-rings 54–54, and thus aid in sealing the outer periphery of plunger 18. It will be further observed that the inwardly disposed packing member 52 seals crankcase area 37 from opening 56, while the outwardly disposed packing member 53 seals the pumping chamber 40 from opening 56.

It will be observed that the outer guide 46 is longer in its axial dimension than the inner guide 45. Such an arrangement matches the guiding requirements to the structure, that is, the guide at the pressure end of the plunger 18 is elongated to a greater extent than the guide member 45.

FIG. 9 illustrates a modified embodiment of the structure wherein a single guide ring is employed. In this arrangement, it will also be observed that a pair of seal rings are utilized, one being disposed on either side of the lantern ring. The arrangement is held in place in the same manner as that previously discussed, and the function is, of course, identical. In order to assist in removal of plunger 65 from the remaining portions of the assembly, a threaded bore is provided as at 66 in order to permit a tool to be engaged and thus permit the serviceman to lift or otherwise remove the plunger 65 from the structure. Also, it will be observed that the spring 67 illustrated in FIG. 4 is somewhat shorter in its normal length than is the spring 41, this being due to the shorter cavity depth available in the plunger 65.

Conventional materials of construction may be utilized to fabricate the pump structure of the present invention, with no unusual features being required. As has been indicated, the connecting rod or yoke which would normally be required to retract plunger 18 is not utilized, with a spring return feature being employed in lieu of such a connecting rod. It will be appreciated, of course, that for certain applications of this pumping arrangement, a positive return may be employed.

We claim:

1. In a reciprocating pump:

a. a body having an inlet port, an outlet port, a cylinder bore formed therein and extending therethrough and having an inner end and an outer end, the bore being arranged to receive reciprocating plunger means therewithin, plunger means disposed within said bore, a rotary drive shaft journaled for rotation in said body and having eccentric means coupled thereto and operatively associated with said plunger for imparting reciprocatory motion thereto, a pumping chamber defined by said cylinder bore and generated by the motion of said reciprocating plunger means;

b. fluid channels formed in said body and extending from said inlet and outlet ports to said pumping chamber and having inlet and outlet valve means disposed therealong and operative to control admission and discharge of fluid to and from said chamber;

c. cylinder head means secured to said body and isolating said pumping chamber from atmosphere and having a relieved inner surface zone for fluid flow and a projection surface abutting the surface of said body;

d. a crankcase disposed in said body and housing said rotary drive shaft and being disposed at the inner end of said cylinder bore;

e. at least one counterbore being formed along said cylinder bore at the outer end thereof and having a step formed at the base thereof, guide means, packing means and lantern ring means disposed as a stack within said counterbore and operative to guide said plunger in its reciprocatory motion and to seal said plunger between said pumping chamber and said crankcase, said abutting surface being in bearing contact with the outer end surface of said stack;

f. a transverse bore extending radially outwardly from said counterbore at a certain axial position therealong and passing through said body;

g. said guide means and packing means including at least one sleeve guide member and a pair of seal rings, said lantern ring means having at least one radially extending bore passing through the wall thereof and being disposed at said certain axial position and providing communication between said counterbore and atmosphere; and h. said seal ring means being axially spaced, one from another, and being disposed on opposite sides of said lantern ring means, with the inwardly disposed seal ring being supported by said step.

2. The reciprocating pump as defined in claim 1 being particularly characterized in that spring means are provided for imparting reciprocatory motion to said plunger during the intake stroke of said pump structure.

3. The reciprocating pump structure as defined in claim 1 being particularly characterized in that said seal rings include a ring of molded polytetrafluoroethylene with the inner surface being held in firm abutting contact with the outer surface of said plunger.

4. The reciprocating pump structure as defined in claim 1 being particularly characterized in that the cross-section of said lantern ring is in substantially I configuration

5. The reciprocating pump structure as defined in claim 1 being particularly characterized in that the surface of said reciprocating plunger means in contact with the eccentric means of said drive shaft is provided with a hardened wear surface.

6. In a reciprocating pump:

a. a body having an inlet port, an outlet port, a cylinder bore formed therein and extending therethrough and having an inner end and an outer end, the bore being arranged to receive reciprocating plunger means therewithin, plunger means disposed within said bore, a rotary drive shaft journaled for rotation in said body and having eccentric means coupled thereto and operatively associated with said plunger for imparting reciprocating motion thereto, a pumping chamber defined by said cylinder bore and generated by the motion of said reciprocating plunger means;

b. fluid channels formed in said body and extending from said inlet and outlet ports to said pumping chamber and having inlet and outlet valve means disposed therealong and operative to control admission and discharge of fluid to and from said chamber;

c. cylinder head means secured to said body and isolating said pumping chamber from atmosphere and having a relieved inner surface zone for fluid flow and a projection surface abutting the surface of said body;

d. a crankcase disposed in said body and housing said rotary drive shaft and being disposed at the inner end of said cylinder bore;

e. a first counterbore formed along said cylinder bore at the outer end thereof and having a first step formed at the base thereof, a second counterbore formed within said first counterbore and having a second step formed at the juncture of said first and second counterbores, first guide means disposed within said first counterbore and with the inner end thereof being seated upon said first step, second guide means, packing means and lantern ring means being disposed as a stack assembly within said second counterbore, said first and second guide means and said packing means and lantern ring means being operative to guide said plunger in its reciprocatory motion and to seal said plunger between said pumping chamber and said crankcase;

f. a transverse bore extending radially outwardly from said second counterbore at a certain axial position therealong and passing through said body;

g. each of said guide means being sleeve guide members, and said packing means including a pair of seal rings, and said lantern ring means having at least one radially extending bore passing through the wall thereof and being disposed at said certain axial position and providing communication to atmosphere, said abutting surface being in bearing contact with the outer end surface of said stack; and h. said seal ring means being axially spaced, one from another, and being disposed on opposite sides of said lantern ring means, with the inwardly disposed seal ring being supported at least partially by said second step.

7. The reciprocating pump as defined in claim 6 being particularly characterized in that a pair of guide means are provided, with a first guide means being in abutting contact with said first counterbore step, and with a second guide means being disposed at the outer end of said second counterbore.

8. The reciprocating pump structure as defined in claim 7 wherein the guide means arranged adjacent the outer end of said second counterbore is substantially longer in axial dimension than the inwardly disposed guide.

9. The reciprocating pump structure as defined in claim 6 being particularly characterized in that said guide means, packing means, and lantern ring means are held in compressed disposition by contact with the inner face of said head means.

* * * * *

UNITED STATES PATENT OFFICE
CERTIFICATE OF CORRECTION

PATENT NO. : 3,947,157

DATED : March 30, 1976

INVENTOR(S) : Harry J. Sadler; Ramon Pareja; John Leschisin

It is certified that error appears in the above-identified patent and that said Letters Patent are hereby corrected as shown below:

Column 3, line 38, "herein" should read -- therein --.

Column 4, line 25, "Fig. 9" should read -- Fig. 4 --.

Column 5, line 1, before the word "cylinder" insert -- c. --. Line 62, "reciprocating" should read -- reciprocatory --.

Signed and Sealed this

*first* Day of *June 1976*

[SEAL]

*Attest:*

RUTH C. MASON
*Attesting Officer*

C. MARSHALL DANN
*Commissioner of Patents and Trademarks*